United States Patent [19]

Khattab et al.

[11] 4,159,286

[45] Jun. 26, 1979

[54] NUCLEATED NYLON/PTFE COMPOSITIONS

[75] Inventors: Ghazi M. A. Khattab, Succasunna; Peter P. Salatiello, Morris Plains, both of N.J.

[73] Assignee: Allied Chemical Corporation, Morris Township, Morris County, N.J.

[21] Appl. No.: 800,130

[22] Filed: May 24, 1977

[51] Int. Cl.$^2$ .............................................. C08L 77/00
[52] U.S. Cl. ......................... 260/857 UN; 260/857 L; 260/37 N
[58] Field of Search ...................... 260/857 L, 857 UN

[56] References Cited

U.S. PATENT DOCUMENTS

| | | | |
|---|---|---|---|
| 2,975,128 | 3/1961 | Stott | 260/857 L |
| 2,998,397 | 8/1961 | Riesing | 260/857 L |
| 3,005,795 | 10/1961 | Busse | 260/857 L |
| 3,013,967 | 12/1961 | Miller | 260/857 L |
| 3,126,339 | 3/1964 | Stott | 252/12 |
| 3,287,288 | 11/1968 | Reiling | 260/857 L |
| 3,356,759 | 12/1967 | Gerow | 260/857 L |
| 3,356,760 | 12/1967 | Matray | 260/857 L |
| 3,554,932 | 1/1971 | Overcashier | 260/857 L |
| 3,862,918 | 1/1975 | Laurent | 260/857 UN |
| 3,908,038 | 9/1975 | Nienart | 260/857 UN |

OTHER PUBLICATIONS

Concise Chemical & Technical Dictionary; H. Bennett, Chemical Publ. Co. N.Y. (1947) p. 896.
H. F. Mark; Encyclopedia of Polymer Science and Technology; Interscience Publ. New York (1969); vol. 10, pp. 466–467.

Primary Examiner—Paul Lieberman
Attorney, Agent, or Firm—Robert A. Harman

[57] ABSTRACT

Composition of nylon-6 and 5–25% fine particle size, waxy PTFE/0.01–10% nucleating agent for alpha crystallization of the nylon-6 ingredient. The composition is useful as a sleeve bearing for steel cable by virtue of its low friction and high wear resistance against such cable and the ease of extruding it from the melt to produce a flexible tube.

3 Claims, No Drawings

NUCLEATED NYLON/PTFE COMPOSITIONS

BACKGROUND OF THE INVENTION

In various mechanical assemblies, it is known to utilize steel cable to connect a working part to the actuating part, e.g. in throttle, detent, clutch and brake assemblies. A tube or sleeve within which the cable slides is provided to guide the cable. It is essential that this tube should have adequate impact resistance and resistance to deformation under load coupled with low friction and high wear resistance as the cable slides within the tube.

One type of composition which has been proposed for use in bearings of various types is a blend of nylon with a minor proportion by weight of polytetrafluoroethylene ("PTFE"). Pertinent patent disclosures are the following.

U.S. Pat. No. 3,005,795 of Oct. 24, 1961 to Busse et al. This patent points out difficulties in fabricating high molecular weight organic polymers such as polyamides and others by extrusion, because of the rapid change of viscosity with temperature in such polymers. The patent proposes blends of such polymers with, as modifier, polytetrafluoroethylene resin in the form of finely divided microfibrous and submicrofibrous particles having diameters ranging from about 100 Å up to about 2 microns, i.e. from 0.01–2 microns. The utility disclosed in the only Example using nylon (Ex. 6, nylon-6,6) is "for extrusion as a coating on wire and as film or thin sheeting." It is stated that treatment of PTFE by heating above 330° C. for some time, or by irradiation by high energy electron beam renders the polytetrafluoroethylene not suitable for use in the practice of the subject invention, because the PTFE thus treated no longer tends to form ultra-fine fibrils.

U.S. Pat. No. 3,287,288 of Nov. 22, 1966 to Reiling. The patent relates to compositions of powdered tetrafluoroethylene resin with a thermosetting or a thermoplastic resin to produce a ball-joint socket, sleeve bearing or other type bearing having low surface friction characteristic and considerable resistance to deformation under load. The PTFE is initially degraded by exposure at elevated temperature for a period of about 2 hours, whereby its tendency to agglomerate is ameliorated. Use of "nylon type plastics" is disclosed.

U.S. Pat. No. 3,908,038 of Sept. 23, 1975 to Nienart et al. This patent relates to thermoplastic compositions containing a polyamide such as polycaproamide (i.e. nylon-6), finely divided PTFE, and an inert filler from the group consisting of silica and magnesium oxide to provide increased creep and wear resistance for production of bearing surfaces. In the examples, the compositions are injection molded or compression molded. The subject compositions contain 40 to 60% PTFE along with correspondingly 60 to 40% of polyamide and additionally, about 2 to 11% by weight of the composition of the inert filler.

Also, of interest in the prior art is a literature article "Plastics World" of October 1976, pp. 46 et. seq. relating to compositions from nylon-6,6, i.e. poly(hexamethylenediamine adipamide) and PTFE of "low molecular weight". The compositions, especially those containing a filler such as glass fiber, are used in producing bearings.

An important consideration in producing plastic tubing, such as the above-noted sleeve bearings for steel cable, is that the plastic used should be extrudable to commercial quality tubing at commercial rates. In general, the nylon/PTFE blends of the prior art, even if extrudable to films and sheets, are not extrudable to tubing because production of tubing requires high dimensional stability in the fused state, to maintain the proper inside and outside diameters of the tubing until the extruded tubing has cooled sufficiently to hold its shape.

SUMMARY OF THE INVENTION

We have now found a composition which, first, is relativly easily compounded, for example, by tumbling the base resin in a drum tumbler for about 15 minutes with the PTFE ingredient, then subjecting the mixture to shearing action, for example, to extrusion in the melt, and then pelleting the resulting blend. Furthermore, our resulting composition shows good extrudability to tubing having the necessary impact and deformation resistance, and shows excellent anti-friction and anti-wear properties when in contact with a sliding steel cable.

More particularly, our composition is a polycaproamide/polytetrafluoroethylene ("PTFE") composition extrudable to form flexible tubing, having low friction and low wearing properties when serving as a sleeve bearing for steel wire, wherein:
1. The polycaproamide has molecular weight corresponding to Formic Acid Relative Viscosity by ASTM Test Method D-789-72, in the range from about 30 to about 150;
2. The polytetrafluoroethylene is a particulate, waxy product, having melt index at 360° C. and 2160 gm. load in the range from 0.1 to 100 grams/10 minutes, by ASTM method D-1238-73. The PTFE particles have average diameter not over 50 microns;
3. The composition includes as nucleating agent 0.01% to 10%, by weight of the total composition, of at least one water-insoluble organic salt or inorganic salt or oxide, capable of promoting alpha crystallization of polycaproamide and having average particle diameter not over 40 microns; the polytetrafluoroethylene constitutes from 5% to 25% by weight of the total composition; and the polycaproamide constitutes essentially the balance of the composition; and
4. The additives are dispersed throughout the polycaproamide, such that the particles and agglomerates have average diameter not exceeding 50 microns; and such that the melt index of the composition, by ASTM Test Method D-1238-73 at 235° C. and 1000 gm. load, is at least two units below that of the polycaproamide without said polytetrafluoroethylene.

DESCRIPTION OF THE PREFERRED EMBODIMENTS

As above noted, we use in our composition specifically polycaproamide (i.e., nylon-6). We have found that when using the PTFE waxy additive employed in our composition, this additive interacts in some way with nylon-6 so as to modify the melt viscosity thereof, imparting greater melt strengths to the nylon-6 and lowering its melt index by at least 2 units.

We have also observed that nylon-6 molecular weight in the lower ranges actually tends to improve the wear resistance of our composition in the particular service, involving use as a sleeve bearing at relatively low rates of sliding by a steel wire or cable; accordingly, we use preferably nylon-6 of molecular weight corresponding to Formic Acid Relative Viscosity of 30–100, and more particularly, 35–70. It is desirable, also, that the nylon-6 should be heat stabilized to assure adequate stability during long term use at elevated temperatures.

In our composition we employ a nucleating agent. Such nucleating agents for nylon-6 are known and are incorporated in particular grades of nylon-6 available commercially. Nucleating agents suitable for our purpose are described, for example, in Canadian Pat. No. 866,252 of Mar. 16, 1971 to Sherman. Broadly speaking, they are water-insoluble organic salts or inorganic salts or inorganic oxides, capable of promoting crystallization of polycaproamide to the so-called alpha form of crystals, instead of the gamma form usually obtained by cooling polycaproamide from the melt. Such nucleating agents depend in part for their effectiveness on small particle size. The particle size should be an average of no more than 40 microns diameter, preferably no more than 20 microns and more particularly no more than 10 microns in diameter. A preferred nucleating agent is talc; preferred amounts are in the range of about 0.1 percent up to about 6 percent by weight of the polycaproamide ingredient.

The PTFE ingredient of our composition is a particulate, waxy PTFE which has been produced by polymerization of tetrafluoroethylene in aqueous suspension or dispersion followed by subjecting the resulting polytetrafluoroethylene to beta or gamma radiation of intensity between 5 to 50 megarads to reduce its molecular weight and thereby produce a waxy product. The radiation may be supplied by an electron beam gun or by cobalt 60. The particles are then preferably subdivided into a fine powder not over 20 microns and especially not over 10 microns average diameter by air milling or mechanical milling procedures. The melt index of the resulting PTFE is in the range from about 0.1 to 100 gm. per 10 minutes at 360° C., and 2160 gm. load, preferably from about 1 to 5 as measured by the standard ASTM procedure (D-1238-73). Preferred amounts for use in our composition are about 15 percent by weight of the total composition.

The following method was employed in testing the sleeve bearings produced in accordance with this invention and those produced as controls for comparison purposes.

An iron bar weighing about 2.7 kilograms was attached to a wire cable made up of 7 bundles of wire each having 7 strands, resulting in diameter of about 1.55 millimeters. The wire cable was about 75 centimeters in length. The bar and attached wire and clamps were weighed.

The same assembly was then weighed on a spring scale in order to calibrate the spring scale. Then one end of the wire was attached to the scale with the scale in a horizontal position and with the wire passing through the plastic tube to be tested. The tube and wire were draped over a circular mandrel of 10 inch diameter so as to contact an arc of 90° of the circumference of the mandrel. The tube was held stationary with respect to the mandrel and the wire was free to slide back and forth in the tube. An oscillating device attached to the far end of the scale imposed a back and forth sliding movement of the wire in the sleeve over a distance of about 5 centimeters.

The oscillator was run at a rate of about 1 cycle per second for about an hour at which time the initial reading was taken (at reduced oscillation rate of 2 cycles per minute) of the average value of the maximum force reading on the spring scale. The oscillation rate of 1 cycle per second was then resumed, with further readings taken likewise at the intervals noted in the Table below.

A "percent efficiency" value was calculated from the ratio between the actual measured weight of the iron bar, wire and clamps, and the average maximum force read on the scale after various numbers of cycles during the test. Wear was evaluated by determining weight loss of the tube resulting from the testing, and/or by observing the appearance of a groove formed by the testing, or the rupture of the tube.

EXAMPLE

The following Example illustrates our invention and the best mode contemplated by us for carrying out the invention, but is to be understood as illustrative and not as limiting.

A commercial heat-stabilized polycaproamide (nylon-6) having Formic Acid Relative Viscosity of about 65–70, containing about ½ of 1 percent by weight of talc, was tumbled in a drum tumbler for 15 minutes with a PTFE wax. This PTFE has average particle diameter of about 6 microns and maximum particle diameter of about 15 microns, a melt index of about 2 gm. per 10 minutes at 360° C. and 2160 gm. load and a melting point, by differential scanning calorimeter ("DSC"), of about 328° C. The PTFE was about 15 percent by weight of the total composition of PTFE and nylon-6.

The mixture was supplied to the hopper of a high-energy twin-screw mixer operating at temperatures of about 260° C.–300° C. The composition in the form of a strand extruded from the mixer was pelleted, and dried to low moisture content of not above 0.1 weight percent. The base nylon-6 material has melt index of about 6–7 gm. per 10 minutes at 235° C. and 1000 gm. load and the composition thereof with the PTFE had melt index of about 3. The base nylon contains about ½ of 1 percent of talc incorporated therein as nucleating agent. Another composition was similarly prepared using the same ingredients but with lower energy applied in melt blending; and also a like composition to this, but using lower molecular weight nylon-6 (melt index 11–12 for the nylon, and about 8 gm. per 10 minutes for the nylon/PTFE blend).

Such compositions were extruded as a melt to form tubing by use of conventional extrusion apparatus in which an annular extrusion orifice is formed between the barrel of the extruder and a mandrel supported centrally thereof. The resulting tubing had inside diameter of about 3.2 mm. and outside diameter of about 4.0 mm. The tubing was smooth and regular. It was produced at about the normal rate used in our laboratories for producing like tubing from the same grade of nylon-6 without added PTFE.

For comparison, tubing was likewise formed from the same grade of nylon-6, either without nucleating agent, or without PTFE; and from a composition consisting of commercial general purpose grade nylon-6,6 (having similar melt index to that of the above nylon-6) blended as above described with 15% by weight of the same PTFE as above described. (This nylon-6,6 material, even with the PTFE added thereto, was not sufficiently dimensionally stable upon extrusion, to allow forming more than short lengths of useable tubing.) Also high molecular weight, extrusion grade nylon-6,6 and extrusion grade nulceated nylon-6 (0.5 wgt. percent talc) of melt index about 1 to 3 were substituted for the general purpose grade nylon-6,6, and nylon-6, blended with 15% PTFE as above.

The results of friction and wear tests upon the tubing, using the above described test method, are summarized below:

TABLE

| Composition | Cycles (in 1000's) | % Eff'y | % Wgt. Loss | Groove |
|---|---|---|---|---|
| Nylon-6/PTFE | Initial | 87 | | |
| (nylon M.I.=6-8) | 1.2 | 89 | | |
| (High energy | 3.6 | 93 | | |
| melt blending) | 8.6 | 93 | | |
| (blend M.I.= | 175. | 92 | | |
| 1.5-2.5) | 260. | 90 | | |
| | 350. | 89 | | |
| | 650. | 89 | Not over 0.5 | None |
| Lower energy blending | | | | |
| Nylon-6/PTFE | Initial | 84 | | |
| (nylon M.I.=6-8) | 400. | 81 | | |
| (blend M.I.=ca. 3) | 560. | 80.5 | 0.55 | Slight |
| Nylon-6/PTFE | Initial | 84 | | |
| (nylon M.I.=11-12) | 400. | 83 | | Slight |
| (blend M.I.=ca. 8) | | | | |
| Nylon-6/PTFE (no nucl.ag) | Initial | 80.5 | | |
| (nylon M.I.=6-8) | 500. | 78 | | |
| Nylon-6, no PTFE | Initial | 81 | | |
| (nylon M.I.=6-8) | 340. | 56 | | |
| Nylon-6,6/PTFE | Initial | 84 | | |
| (nylon M.I.=6-8) | 164. | — | Over 3 | Worn through |
| Nylon-6,6/PTFE | Initial | 84 | | |
| (nylon M.I.=1-2) | 590. | 78 | 1.1 | Distinct |
| (blend M.I.=ca.1) | | | | |
| Nylon-6/PTFE | Initial | 84 | | Slight |
| (nylon M.I.=1-3) | 300 | 78 | | |

We claim:

1. Polycaproamide/polytetrafluoroethylene composition extrudable to form flexible tubing having low friction and high wear resistance, when serving as a sleeve bearing for steel wire, wherein:
   (1) the polycaproamide has molecular weight corresponding to Formic Acid Relative Viscosity, by ASTM Test Method D-789-72, in the range from about 30 to about 150;
   (2) the polytetrafluoroethylene is a particulate, waxy product, having melt index by ASTM Test Method D 1238-73 at 360° C. and 2160 gm. load, in the range from 0.1 to 100 gm. per 10 minutes; and the PTFE particles have average diameter not over 50 microns;
   (3) the composition includes as nucleating agent 0.01% to 10%, by weight of the total composition, of at least one water-insoluble organic salt or inorganic salt or oxide, capable of promoting alpha crystallization of polycaproamide and having average particle diameter not over 40 microns; the polytetrafluoroethylene constitutes from 5% to 25% by weight of the total composition; and the polycaproamide constitutes essentially the balance of the composition; and
   (4) the additives are dispersed throughout the polycaproamide, such that the particles and agglomerates have average diameter not exceeding 50 microns; and such that the melt index of the composition, by ASTM Test Method D 1238-73 at 235° C. and 1000 gm. load, is at least 2 units below that of the polycaproamide without said polytetrafluoroethylene.

2. Composition of claim 1 wherein the polycaproamide is heat stabilized; and has Formic Acid Relative Viscosity in the range of 30–100 and contains about 0.1%–6% of talc, by weight of the polycaproamide ingredient, having average particle diameter not over 20 microns; and wherein the PTFE ingredient has melt index in the range of about 1 to 5 gm. per 10 minutes at 360° C. and 2160 gm. load, has average particle diameter not over 20 microns, and amounts to about 15% by weight of the composition.

3. Composition of claim 2 wherein the polycaproamide has Formic Acid Relative Viscosity in the range of 35–70, and the talc and PTFE each has average particle diameter not over 10 microns.

* * * * *

UNITED STATES PATENT AND TRADEMARK OFFICE
CERTIFICATE OF CORRECTION

PATENT NO. : 4,159,286
DATED : June 26, 1979
INVENTOR(S) : G. M. A. Khattab and P. P. Salatiello It is certified that error appears in the above-identified patent and that said Letters Patent are hereby corrected as shown below:

Col. 5, line 6 of table, "8.6" should read --86.--.

Col. 5, line 54, after "the" should read --polytetrafluoroethylene constitutes from 5% to 25% by weight of the total composition; and the polycaproamide constitutes essentially the balance of the composition; and
    (4) the additives are dispersed throughout the polycaproamide, such that the particles and agglomerates--.

Signed and Sealed this

First Day of July 1980

[SEAL]

Attest:

SIDNEY A. DIAMOND

Attesting Officer     Commissioner of Patents and Trademarks